United States Patent
Fang (10) Patent No.: US 10,772,461 B2
(45) Date of Patent: Sep. 15, 2020

(54) MOVING ASSEMBLY OF A COFFEE MAKER

(71) Applicant: HUASHUAY ENTERPRISE CO., LTD., Keelung (TW)

(72) Inventor: Chih-Ping Fang, Keelung (TW)

(73) Assignee: Huashuay Enterprise Co., Ltd., Keelung (TW)

( * ) Notice: Subject to any disclaimer, the term of this patent is extended or adjusted under 35 U.S.C. 154(b) by 219 days.

(21) Appl. No.: 16/031,049

(22) Filed: Jul. 10, 2018

(65) Prior Publication Data
US 2020/0015620 A1    Jan. 16, 2020

(51) Int. Cl.
*A47J 31/44* (2006.01)
*A47J 31/46* (2006.01)
*A47J 31/06* (2006.01)

(52) U.S. Cl.
CPC ........... *A47J 31/46* (2013.01); *A47J 31/0631* (2013.01); *A47J 31/4475* (2013.01)

(58) Field of Classification Search
CPC ...... A47J 31/46; A47J 31/057; A47J 31/0573; A47J 31/0631; A47J 31/4475
USPC ....... 99/304, 306, 307, 302 R, 315; 222/409, 222/415, 501, 509
See application file for complete search history.

(56) References Cited

U.S. PATENT DOCUMENTS

| | | | | |
|---|---|---|---|---|
| 7,353,850 B2 * | 4/2008 | Greiwe | ............... | A47J 31/4482 141/198 |
| 7,478,584 B2 * | 1/2009 | Turi | .................... | A47J 31/4482 99/279 |
| 9,808,114 B1 * | 11/2017 | Heys | .................... | A47J 31/5255 |
| 2006/0266225 A1 * | 11/2006 | Hammad | ............ | A47J 31/4482 99/279 |
| 2009/0101233 A1 * | 4/2009 | Owens | ................. | B67D 1/0041 141/369 |
| 2012/0183659 A1 * | 7/2012 | Hulett | ................. | A47J 31/0631 426/431 |
| 2013/0125759 A1 * | 5/2013 | Lin | ......................... | A47J 31/44 99/281 |
| 2019/0008311 A1 * | 1/2019 | Lin | ..................... | A47J 31/0631 |
| 2019/0365143 A1 * | 12/2019 | Fang | ................... | A47J 31/4403 |

FOREIGN PATENT DOCUMENTS

DE    102012217007 B4 * 10/2019    ............. A47J 31/46

* cited by examiner

*Primary Examiner* — Reginald Alexander
(74) *Attorney, Agent, or Firm* — Rosenberg, Klein & Lee (57) ABSTRACT

A moving assembly of a coffee maker has a body, a first moving module, and a second moving module. The first moving module is mounted to the body, and has a first slide rail and a feeding component. The first slide rail is connected to the body. The feeding component is slidably mounted to the first slide rail and has a nozzle. The second moving module is mounted to the body below the first moving module, and has a second slide rail and a platform. The second slide rail is connected to the body and located below the first slide rail in a direction intersecting with the first slide rail. The platform is slidably mounted to the second slide rail. Therefore, the nozzle may move against a coffee cup put on the platform in two directions with the two independent moving modules.

8 Claims, 9 Drawing Sheets

MOVING ASSEMBLY OF A COFFEE MAKER

BACKGROUND OF THE INVENTION

1. Field of the Invention

The present invention relates to a moving assembly of a coffee maker, and more particularly to a moving assembly of a coffee maker having independent modules for bi-directional movements between a coffee cup and a nozzle of the moving assembly of a coffee maker.

2. Description of Related Art

A conventional moving assembly of a coffee maker comprises a moving module, which has a nozzle, two drivers, and multiple sliding rails intersecting with one another. The nozzle, the two drivers, and the multiple sliding rails are connected via multiple components, so the nozzle may move relatively to a coffee cup, along a longitudinal direction and a transverse direction on a plane. With such movements, a user may evenly feed water into coffee powder or pour a latte art pattern on coffee.

However, the conventional moving assembly of a coffee maker has the following shortcomings.

1. The components moving in different directions may interfere in moving processes, which causes malfunction of the conventional moving assembly of a coffee maker.

2. The interference also leads to complex installation and time-consuming adjustment for assembly of the moving assembly of a coffee maker.

To overcome the shortcomings of the conventional moving assembly of a coffee maker, the present invention provides a moving assembly of a coffee maker having independent modules for bi-directional movements between a coffee cup and a nozzle of the moving assembly of a coffee maker.

SUMMARY OF THE INVENTION

The main objective of the present invention is to provide a moving assembly of a coffee maker whose nozzle moves against a coffee cup in two directions with two independent moving modules.

The moving assembly of a coffee maker has a body, a first moving module, and a second moving module. The first moving module is mounted to the body, and has a first slide rail and a feeding component. The first slide rail is connected to the body. The feeding component is slidably mounted to the first slide rail and has a nozzle. The second moving module is mounted to the body below the first moving module, and has a second slide rail and a platform. The second slide rail is connected to the body and is located below the first slide rail in a direction intersecting with the first slide rail. The platform is slidably mounted to the second slide rail.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
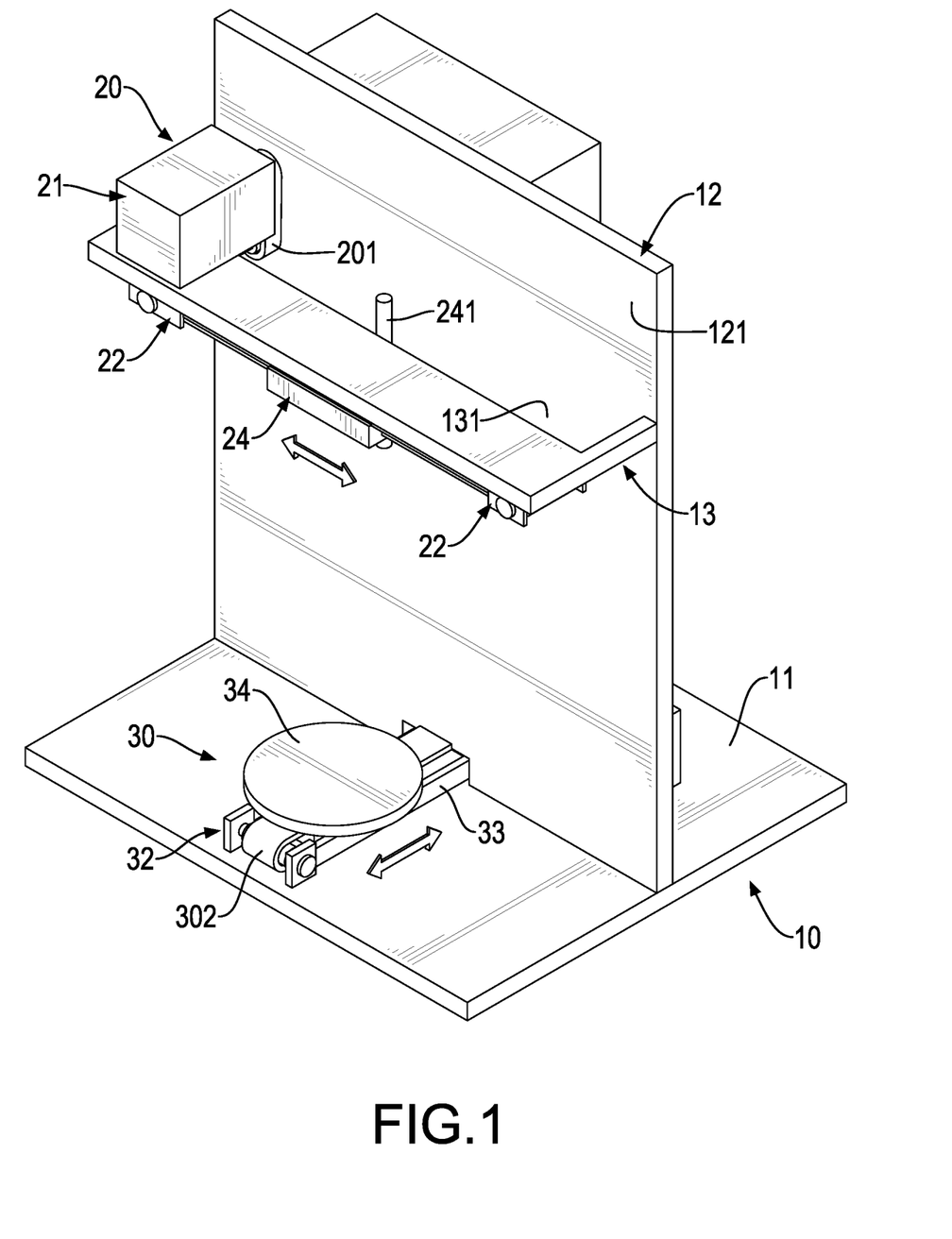
FIG. 1 is a perspective view of a moving assembly of a coffee maker in accordance with the present invention.
Figure 2:
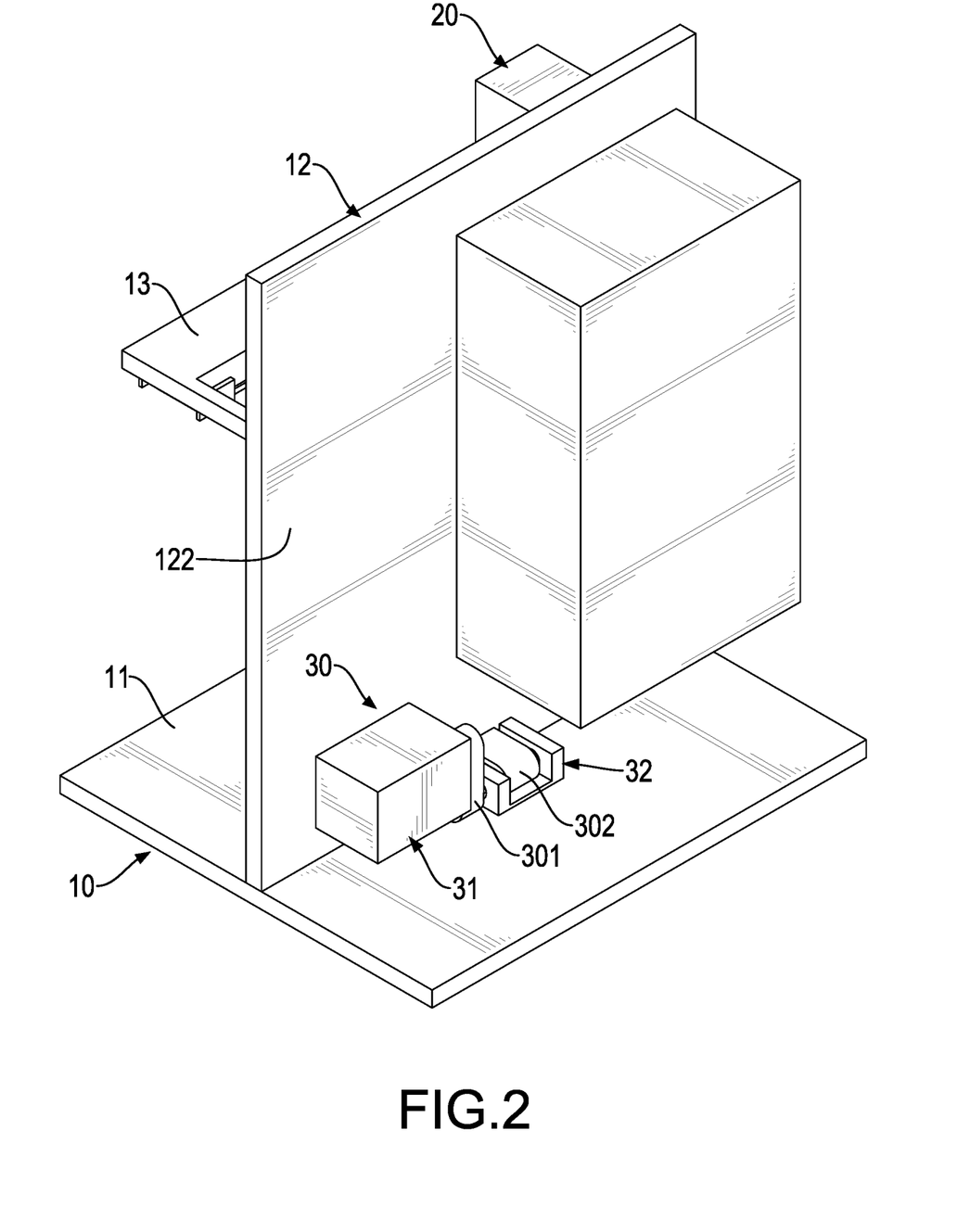
FIG. 2 is another perspective view of the moving assembly of a coffee maker in FIG. 1.
Figure 3:
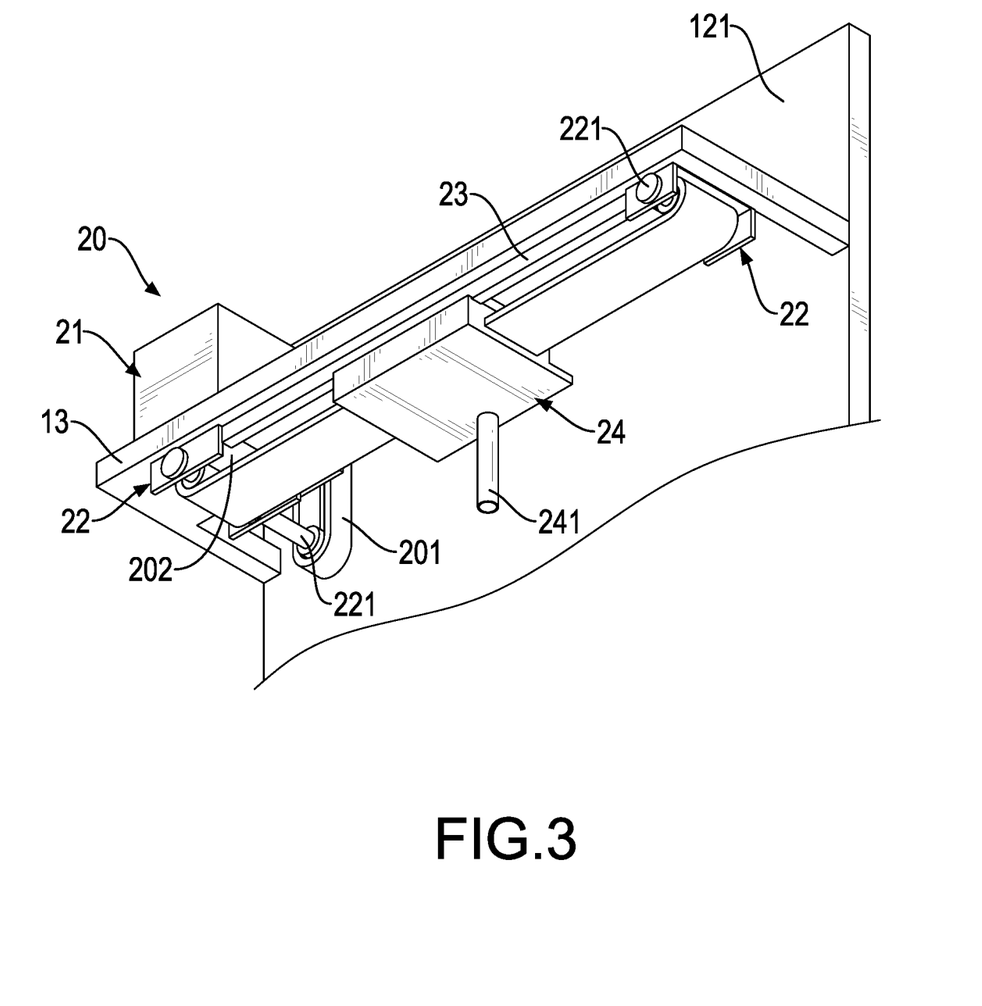
FIG. 3 is a partially enlarged perspective view of the moving assembly of a coffee maker in FIG. 1.
Figure 4:
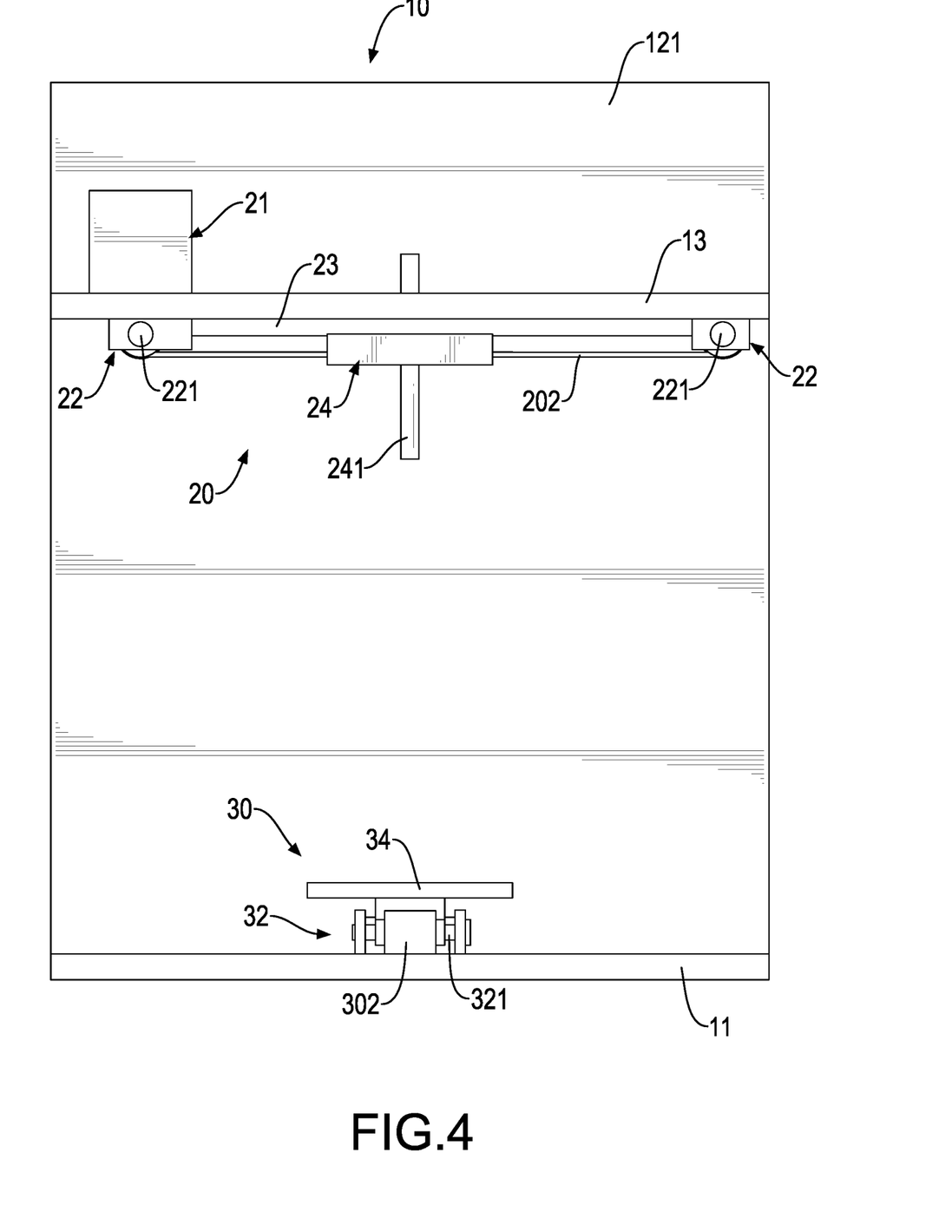
FIG. 4 is a front side view of the moving assembly of a coffee maker in FIG. 1.
Figure 5:
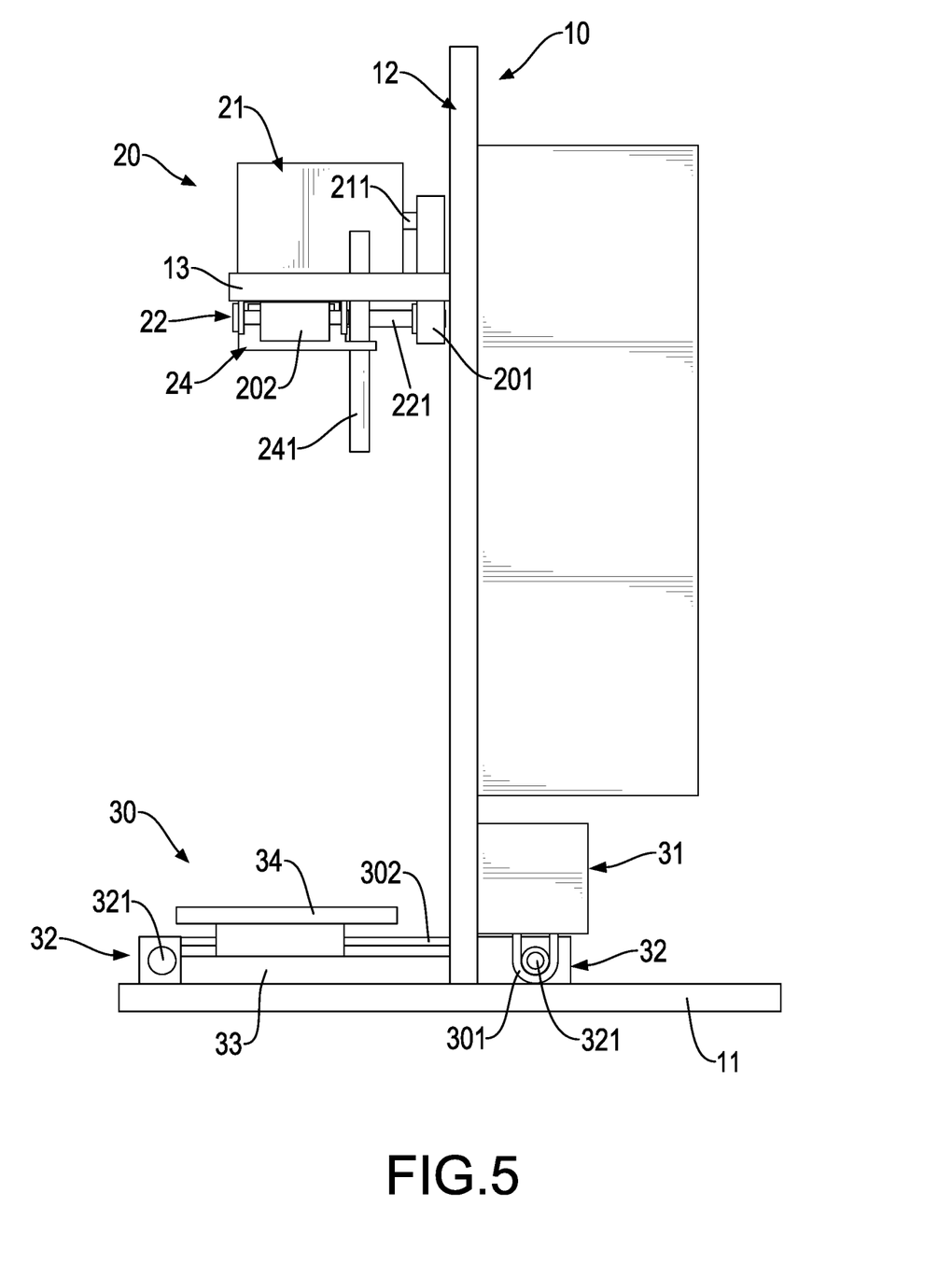
FIG. 5 is a right side view of the moving assembly of a coffee maker in FIG. 1.
Figure 6:
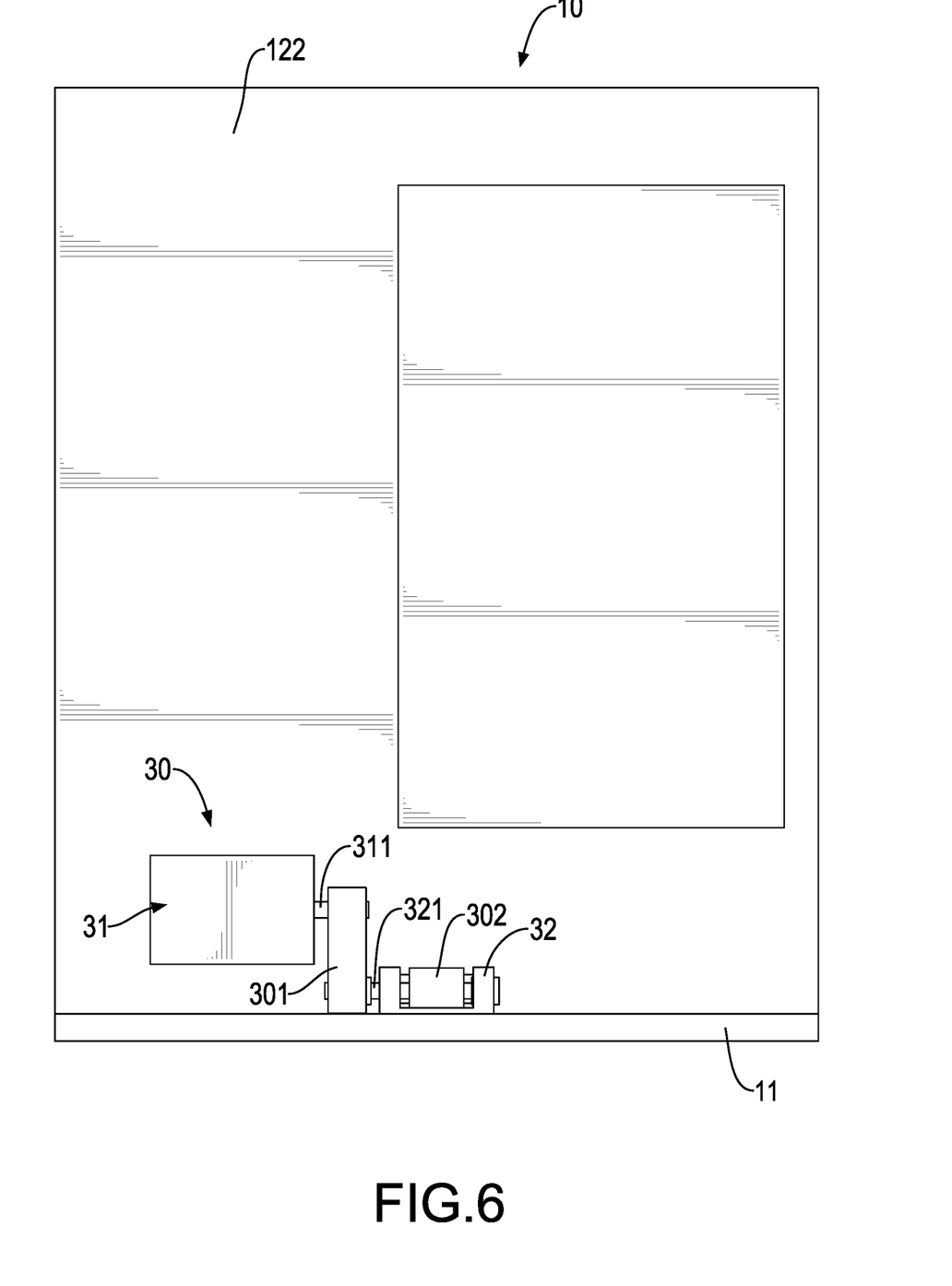
FIG. 6 is a rear side view of the moving assembly of a coffee maker in FIG. 1.

With reference to FIGS. 1 to 3, a moving assembly of a coffee maker in accordance with the present invention comprises a body 10, a first moving module 20, and a second moving module 30.

The body 10 has a base 11, a board 12, and a rack 13. The board 12 is vertically connected to the base 11, and has a front side 121 and a rear side 122. The rack 13 is formed on and protrudes from the front side 121 of the board 12, and is disposed away from the base 11. In addition, the rack 13 has two ends and a gap 131 that is formed between the rack 13 and the board 12.

With reference to FIGS. 1, and 3 to 5, the first moving module 20 is mounted to the body 10, and has a first driver 21, two first rolling components 22, a first driving belt 201, a first slide rail 23, a first connecting belt 202, and a feeding component 24. The first driver 21 is mounted upon the rack 13 near one of the two ends of the rack 13, and has a first shaft 211 protruding toward the front side 121. The two first rolling components 22 are aligned and mounted on a bottom side of the rack 13 and at the two ends of the rack 13, respectively. Each one of the two first rolling components 22 has a first axle 221, and the first connecting belt 202 engages with the two first axles 221. The first axle 221 near the first driver 21 of the two first axles 221 protrudes toward the front side 121, and the first driving belt 201 is connected to the first shaft 211 and the first axle 221.

The first slide rail 23 is mounted to the bottom side of the rack 13 and is located between the two first rolling components 22. With reference to FIG. 3, one of two sides of the first connecting belt 202, which is located near the rack 13, passes through a space between the first slide rail 23 and the rack 13. The feeding component 24 is slidably embedded in the first slide rail 23, and is fixed to the side of the first connecting belt 202 which is away from the rack 13. When the first driver 21 is actuated, with connections of the first driving belt 201 and the first connecting belt 202, the feeding component 24 may transversely move along the first slide rail 23. Furthermore, the feeding component 24 has a nozzle 241. The nozzle 241 is vertically mounted near the front side 121, is disposed in the gap 131, and protrudes beyond two vertical sides of the rack 13.

With reference to FIGS. 1, 2, 5, and 6, the second moving module 30 is mounted to the body 10 and is located below the first moving module 20. The second moving module 30 has a second driver 31, two second rolling components 32, a second driving belt 301, a second slide rail 33, a second connecting belt 302, and a platform 34.

The second driver 31 is mounted on the rear side 122 of the board 12 and is located near the base 11. The second driver 31 has a second shaft 311 protruding in a direction parallel with the board 12. The two second rolling components 32 are mounted on the base 11, and are aligned with and opposite to each other, against the board 12. One of the two second rolling components 32 is located between the rear side 122 and the base 11, and the other second rolling component 32 is located away from the board 12. Each one of the two second rolling components 32 has a second axle 321, and the second connecting belt 302 engages with the two second axles 321. Moreover, the second axle 321 of the second rolling component 32 on the rear side 122 protrudes for the second driving belt 301 to be connected to the second axle 321 and the second shaft 311.

The second slide rail 33 is mounted on the base 11 and is located between the front side 121 of the board 12 and the corresponding rolling component 32 that is on the same side against the board 12. The second slide rail 33 is located below the first slide rail 23 in a direction intersecting with the first slide rail 23. Besides, one of two sides of the second connecting belt 302, which is located near the base 11, passes through a space between the second slide rail 33 and the base 11. The platform 34 is slidably embedded in the second slide rail 33, and is fixed to the other side of the connecting belt 302 that is away from the base 11. When the second driver 31 is actuated, with connections of the second driving belt 301 and the second connecting belt 302, the platform 34 may longitudinally move along the second slide rail 33, in a direction intersecting with the moving direction of the nozzle 241.

Figure 7:
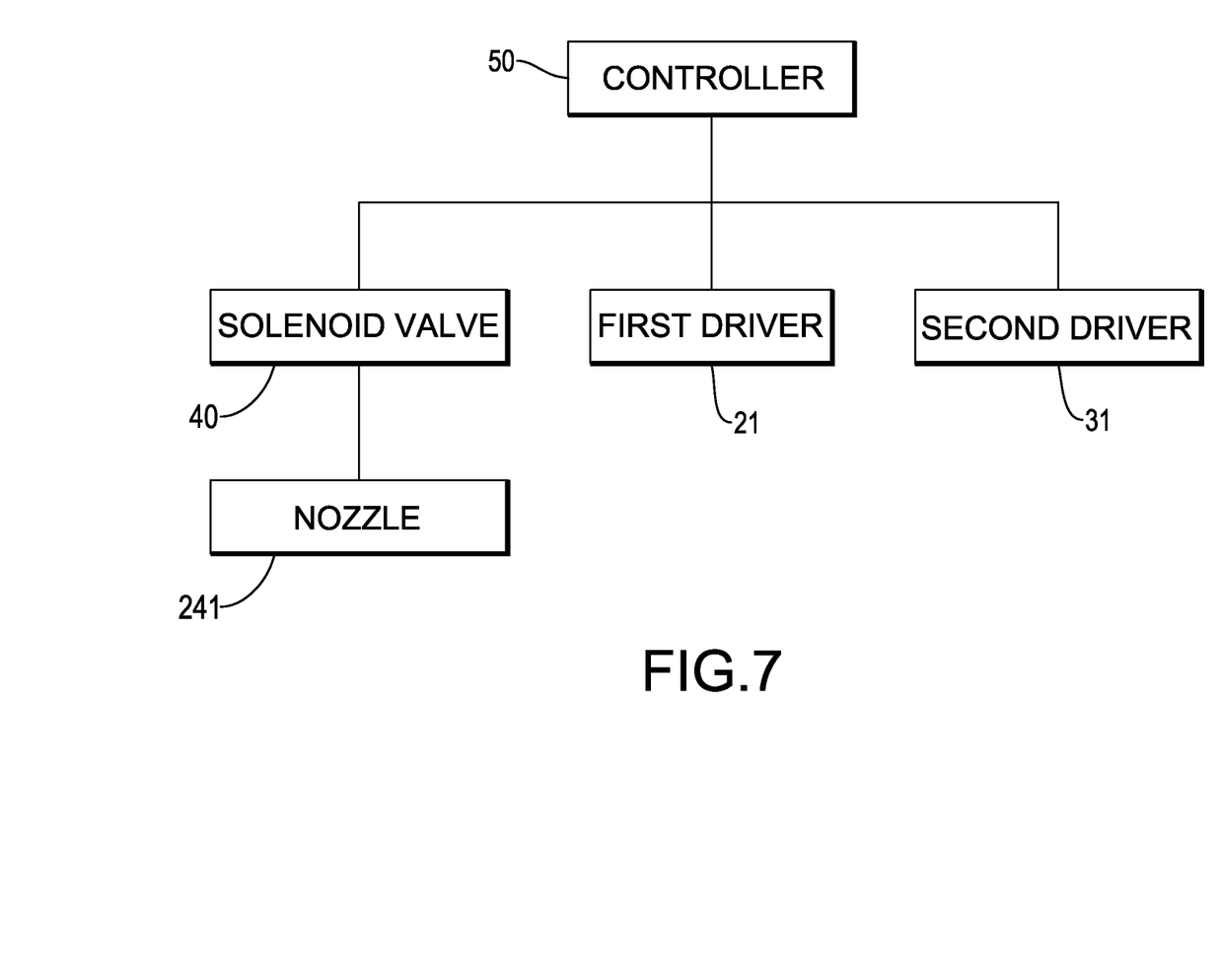
FIG. 7 is a block diagram of an operating method of the moving assembly of a coffee maker in FIG. 1.
Figure 8:
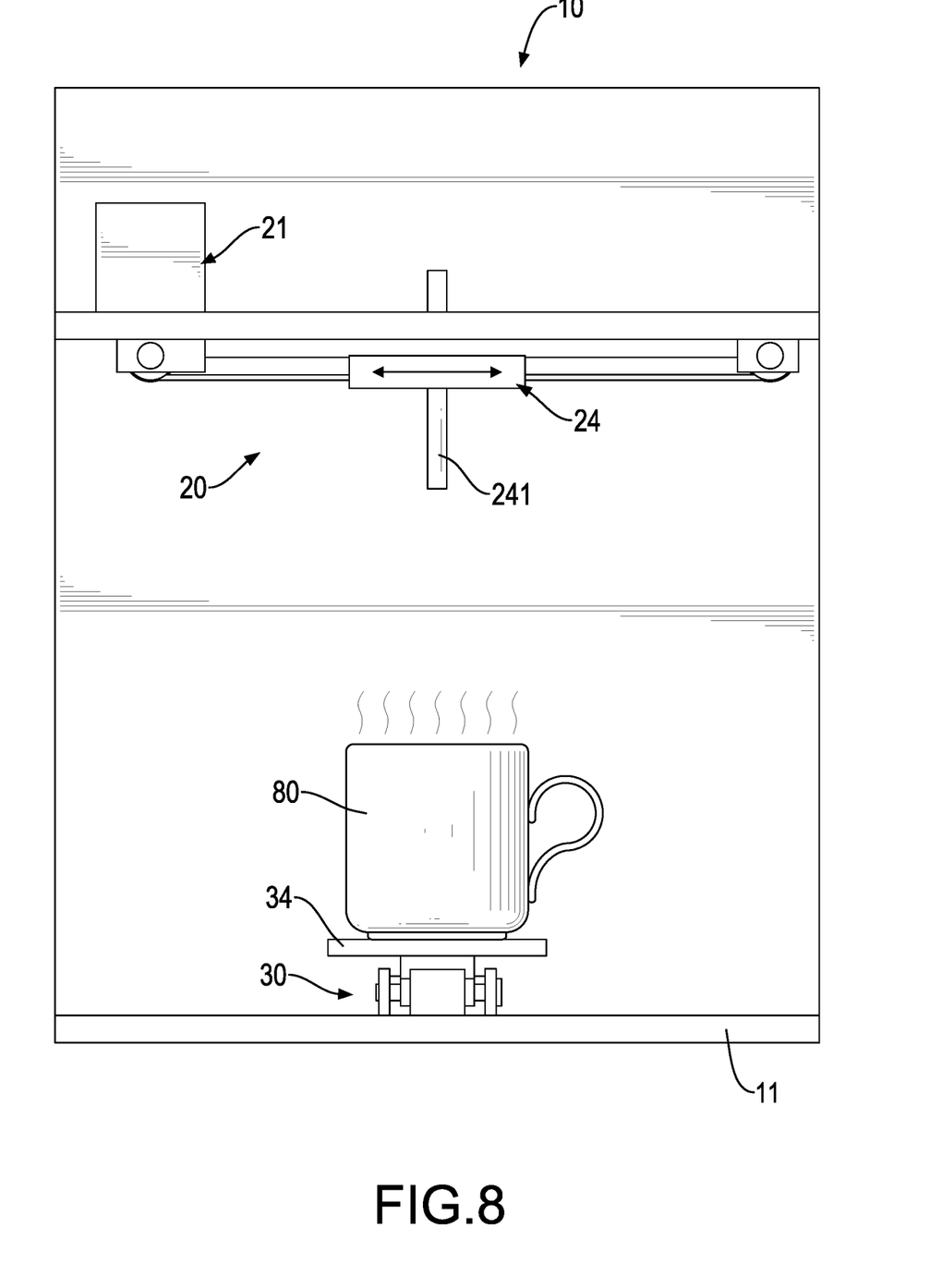
FIG. 8 is an operational front side view of the moving assembly of a coffee maker in FIG. 1.
Figure 9:
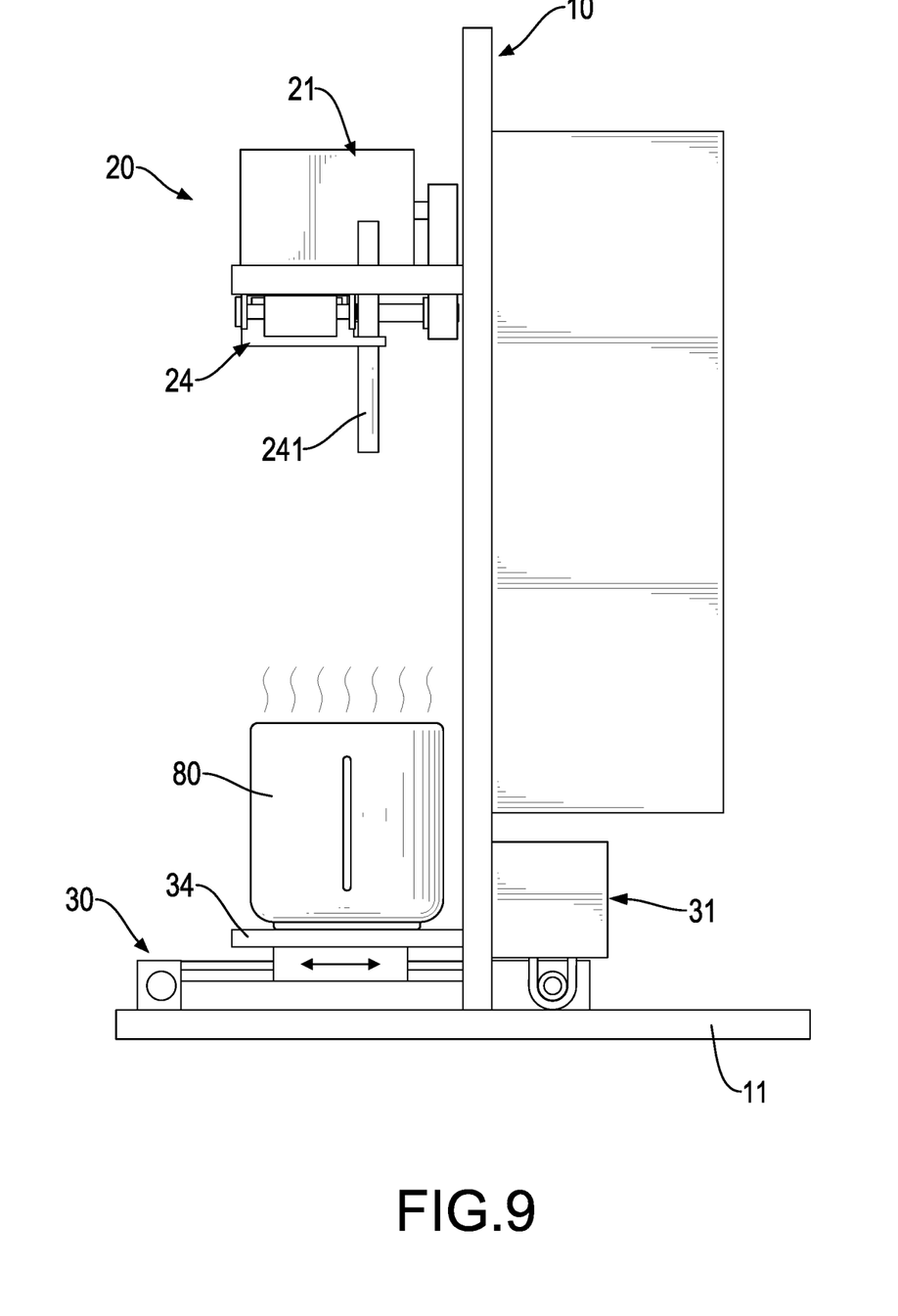
FIG. 9 is an operational right side view of the moving assembly of a coffee maker in FIG. 1.

With reference to FIGS. 7 to 9, when the moving assembly of a coffee maker is in use, the nozzle 241 is connected to a solenoid valve 40 via a pipe, and the solenoid valve 40, the first driver 21, and the second driver 31 are electrically connected to a controller 50. A user may put a coffee cup 80 on the platform 34, and with the nozzle 241 moving transversely and the platform 34 moving longitudinally, the coffee cup 80 and the nozzle 241 relatively move in two dimensions. Therefore, the user may either feed water into coffee powder evenly, or pour a latte art pattern on coffee.

With the aforementioned technical features, the moving assembly of a coffee maker in accordance with the present invention has the following advantages.

1. The first moving module 20 and the second moving module 30 each work independently, so the first moving module 20 and the second moving module 30 may not interfere with each other in their respective movements.

2. If necessary, the two moving modules 20, 30 may be detached from the body 10 or replaced respectively, which makes the moving assembly of a coffee maker easy and time-saving to install and adjust the first moving module 20 and the second moving module 30.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A moving assembly of a coffee maker comprising:
    a body;
    a first moving module mounted to the body and having
        a first slide rail connected to the body; and
        a feeding component slidably mounted to the first slide rail; and
    a second moving module mounted to the body below the first moving module and having
        a second slide rail connected to the body, and located below the first slide rail in a direction intersecting with the first slide rail; and
        a platform slidably mounted to the second slide rail; wherein
    the body has
        a base;
        a board vertically connected to the base; and
        a rack formed on and protruding from a side of the board, and disposed away from the base;
    the second moving module is mounted to the base, and the second slide rail is mounted on the base in a longitudinal direction;
    the first moving module is mounted to the rack, and the first slide rail is mounted to a bottom side of the rack in a transverse direction intersecting with the second slide rail; and
    the second moving module further has
        a second driver mounted on a side of the board opposite to the rack and having a second shaft; and
        two second rolling components respectively mounted on two ends of the second slide rail on the base, each one of the second rolling components having a second axle connected to the second axle of the other one of the second rolling components with a second connecting belt, and one of the two second axles connected to the second shaft with a second driving belt.

2. The moving assembly of a coffee maker as claimed in claim 1, wherein the first moving module further has
    a first driver mounted on the rack and having a first shaft; and
    two first rolling components respectively mounted on two ends of the first slide rail on the bottom side of the rack, each one of the first rolling components having a first axle connected to the first axle of the other one of the first rolling components with a first connecting belt, and one of the two first axles connected to the first shaft with a first driving belt.

3. The moving assembly of a coffee maker as claimed in claim 2, wherein one of two sides of the first connecting belt, which is located near the rack, is mounted through a space between the first slide rail and the rack, and the feeding component is fixed to the other side of the first connecting belt that is away from the rack.

4. The moving assembly of a coffee maker as claimed in claim 1, wherein one of two sides of the second connecting belt, which is located near the base, is mounted through a space between the second slide rail and the base, and the platform is fixed to the other side of the second connecting belt that is away from the rack.

5. The moving assembly of a coffee maker as claimed in claim 2, wherein one of two sides of the second connecting belt, which is located near the base, is mounted through a space between the second slide rail and the base, and the platform is fixed to the other side of the second connecting belt that is away from the rack.

6. The moving assembly of a coffee maker as claimed in claim 3, wherein one of two sides of the second connecting belt, which is located near the base, is mounted through a space between the second slide rail and the base, and the platform is fixed to the other side of the second connecting belt that is away from the rack.

7. A moving assembly of a coffee maker comprising:
a body;
a first moving module mounted to the body and having
a first slide rail connected to the body; and
a feeding component slidably mounted to the first slide rail; and
a second moving module mounted to the body below the first moving module and having
a second slide rail connected to the body, and located below the first slide rail in a direction intersecting with the first slide rail; and
a platform slidably mounted to the second slide rail;
wherein
the first moving module further has
a first driver mounted to the body and having a first shaft; and
two first rolling components respectively mounted to the body on two ends of the first slide rail, each one of the first rolling components having a first axle connected to the first axle of the other one of the first rolling components with a first connecting belt, and one of the two first axles connected to the first shaft with a first driving belt;
the second moving module further has
a second driver mounted to the body and having a second shaft; and
two second rolling components respectively mounted to the body on two ends of the second slide rail, each one of the second rolling components having a second axle connected to the second axle of the other one of the second rolling components with a second connecting belt, and one of the two second axles connected to the second shaft with a second driving belt.

8. A moving assembly of a coffee maker comprising:
a body;
a first moving module mounted to the body and having
a first slide rail connected to the body; and
a feeding component slidably mounted to the first slide rail; and
a second moving module mounted to the body below the first moving module and having
a second slide rail connected to the body, and located below the first slide rail in a direction intersecting with the first slide rail; and
a platform slidably mounted to the second slide rail;
wherein the second moving module further has
a second driver mounted to the body and having a second shaft; and
two second rolling components respectively mounted to the body on two ends of the second slide rail, each one of the second rolling components having a second axle connected to the second axle of the other one of the second rolling components with a second connecting belt, and one of the two second axles connected to the second shaft with a second driving belt.

* * * * *